US008918474B2

(12) United States Patent  (10) Patent No.: US 8,918,474 B2
Bhalerao et al.  (45) Date of Patent: *Dec. 23, 2014

(54) DETERMINING PRIORITIES FOR CACHED OBJECTS TO ORDER THE TRANSFER OF MODIFICATIONS OF CACHED OBJECTS BASED ON MEASURED NETWORK BANDWIDTH

(75) Inventors: Umesh Bhalerao, Pune (IN); Shah Mohammad R. Islam, Tucson, AZ (US); Rinku M. Kothiya, Pune (IN); Sandeep R. Patil, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/430,466

(22) Filed: Mar. 26, 2012

(65) Prior Publication Data

US 2013/0254323 A1  Sep. 26, 2013

(51) Int. Cl.
*G06F 15/167* (2006.01)

(52) U.S. Cl.
USPC ......................................................... 709/213

(58) Field of Classification Search
USPC ......................................................... 709/213
See application file for complete search history.

(56) References Cited

U.S. PATENT DOCUMENTS

| | | |
|---|---|---|
| 2005/0210321 A1 | 9/2005 | Bai et al. |
| 2006/0173956 A1 | 8/2006 | Ulrich et al. |
| 2006/0282628 A1 | 12/2006 | Ueoka et al. |
| 2007/0136308 A1 | 6/2007 | Tsirigotis et al. |
| 2008/0243992 A1 | 10/2008 | Jardetzky et al. |
| 2010/0008228 A1 | 1/2010 | Chakravorty |
| 2012/0089700 A1* | 4/2012 | Safruti et al. ................. 709/217 |

OTHER PUBLICATIONS

P. Mell, et al., "The NIST Definition of Cloud Computing", National Institute of Standards and Technology, Information Technology Laboratory, Version 15, Oct. 7, 2009, pp. 1-2.
T.M. Jones, "Anatomy of a Cloud Storage Infrastructure", IBM Corp., developerWorks, 2010, pp. 1-13.
IBM Corp., "Automated File Management with IBM Active Cloud Engine", IBM Systems and Technology Solution Brief, Oct. 2011, pp. 1-6.
IBM Corp., "Blue Skies for Your Cloud with IBM XIV Storage", IBM Systems and Technology Thought leadership white paper, Oct. 2011, pp. 1-16.

(Continued)

*Primary Examiner* — Tu Nguyen
(74) *Attorney, Agent, or Firm* — David W. Victor; Konrad Raynes Davda & Victor LLP

(57) ABSTRACT

Provided are a computer program product, system, and method for determining priorities for cached objects to order the transfer of modifications of cached objects based on measured network bandwidth. Objects are copied from a primary site to a secondary site to cache at the secondary site. The primary site includes a primary server and primary storage and the secondary site includes a secondary server and a secondary storage. Priorities are received from the secondary server for the objects at the secondary site based on determinations made by the secondary server with respect to the objects cached at the secondary storage. A determination is made of modifications to the objects at the primary storage that are cached at the secondary storage. The received priorities for the objects from the secondary server are used to control a transfer of the determined modifications to the objects to the secondary server.

24 Claims, 14 Drawing Sheets

(56) References Cited

OTHER PUBLICATIONS

IBM Corp., "Hyper-Efficient, Automated, Optimized Cloud Storage", IBM Systems and Technology Solution Brief, Oct. 2011, pp. 1-6.

F. Wang, et al., "Accelerating Linux/Windows File Systems by Predicting Access Frequency", [online] [retrieved Feb. 2, 2012] http://www.allhands.org.uk/2007/proceedings/papers/810.pdf, pp. 1-8.

"In Depth: Internet bandwidth: India Needs a Backbone", [online][retrieved Feb. 2, 2012] http://www.ieo.org/backbone.html, pp. 1-3.

Preliminary Amendment for U.S. Appl. No. 13/472,397, dated May 15, 2012, 8 pp.

U.S. Appl. No. 13/472,397, filed May 15, 2012, entitled "Determining Priorities for Cached Objects to Order the Transfer of Modifications of Cached Objects Based on Measured Network Bandwidth", invented by U. Bhalerao et al., 53 pp.

Notice of Allowance dated May 1, 2014, pp. 11, for U.S. Appl. No. 13/472,397, filed May 15, 2012.

Response dated Apr. 2, 2014, pp. 11, to Office Action dated Jan. 2, 2014, pp. 15, for U.S. Appl. No. 13/472,397, filed May 15, 2012.

* cited by examiner

Object Info Entry

Remote Cache Queue Entry

Network Bandwidth Priority Assignment

Object Information (Secondary Site)

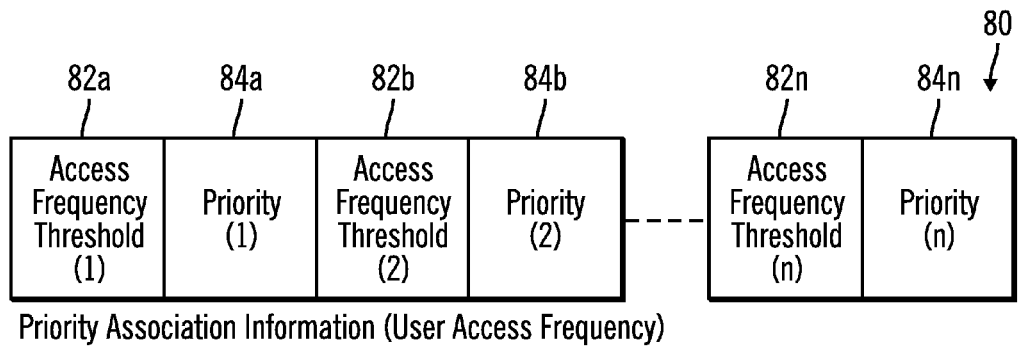
FIG. 6
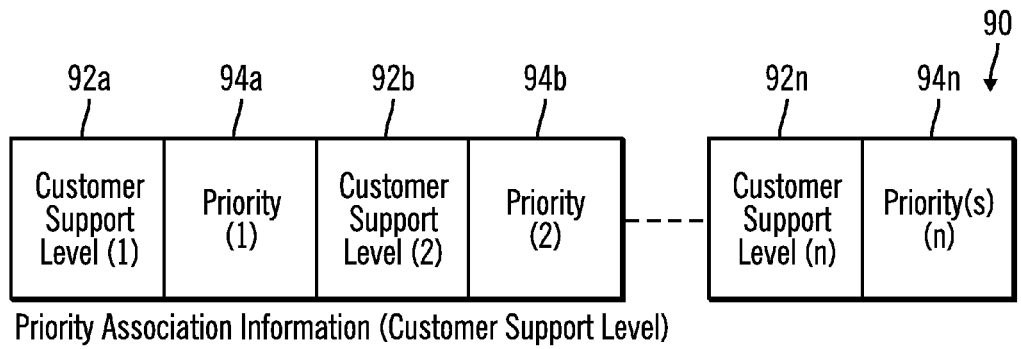
FIG. 7
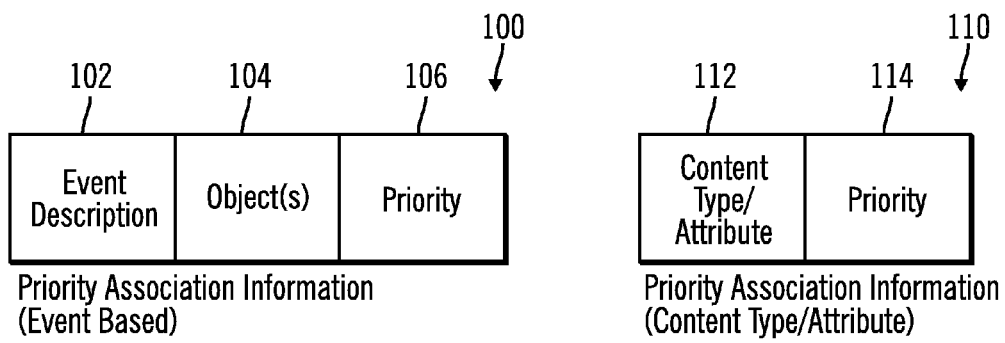
FIG. 8
FIG. 9

US 8,918,474 B2

DETERMINING PRIORITIES FOR CACHED OBJECTS TO ORDER THE TRANSFER OF MODIFICATIONS OF CACHED OBJECTS BASED ON MEASURED NETWORK BANDWIDTH

BACKGROUND OF THE INVENTION

1. Field of the Invention

The present invention relates to a computer program product, system, and method for determining priorities for cached objects to order the transfer of modifications of cached objects based on measured network bandwidth.

2. Description of the Related Art

Wide Area Network (WAN) caching involves replicating data from a primary or source site to one or more secondary site to address WAN performance and network outage issues. The primary and secondary sites may provide network file server services, such as with Network Attached Storage (NAS) servers. With WAN caching, modifications to data cached at remote sites is pre-populated to remote caches at remote sites as soon as changes are made at the primary site for files cached at remote sites to make the data readily available at the remote site. With WAN caching, the data cached at the remote sites is available to users connecting to the remote sites even after disconnection between the remote cache site and the primary source site.

In a large enterprise environment, a large number of files at the primary site may be modified, which results in a large queue of modifications to replicate to the remote sites, which may consume a significant amount of network bandwidth. Further, in certain countries and regions, network bandwidth is very low, so WAN caching may experience bottlenecks during periods of low network bandwidth.

There is a need in the art for improved techniques for optimizing WAN caching data at remote secondary sites.

SUMMARY

Provided are a computer program product, system, and method for determining priorities for cached objects to order the transfer of modifications of cached objects based on measured network bandwidth. Objects are copied from a primary site to a secondary site to cache at the secondary site, wherein the primary site includes a primary server and primary storage and wherein the secondary site includes a secondary server and a secondary storage, wherein the primary and secondary sites connect via a network. Priorities are received from the secondary server for the objects at the secondary site based on determinations made by the secondary server with respect to the objects cached at the secondary storage. A determination is made of modifications to the objects at the primary storage that are cached at the secondary storage. The received priorities for the objects from the secondary server are used to control a transfer of the determined modifications to the objects to the secondary server.

In further embodiments, a secondary site receives objects transmitted from a primary site to cache at the secondary site, wherein the primary site includes a primary server and primary storage and wherein the secondary site includes a secondary server and a secondary storage to cache the objects from the primary site, wherein the primary and secondary sites are connected via a network; The secondary server maintains priority association information providing an association of priorities and object attributes. A determination is made of attributes for the objects cached at the secondary site. A determination is made from the priority association information the priorities for the cached objects corresponding to the determined attributes. The determined priorities are transmitted to the primary server for the objects cached at the secondary storage for the primary server to use control a transfer of the determined modifications to the objects to the secondary server.

BRIEF DESCRIPTION OF THE DRAWINGS

FIG. 6 illustrates an embodiment of user access frequency based priority assignment information.

FIG. 7 illustrates an embodiment of customer support level priority assignment information.

FIG. 8 illustrates an embodiment of event based priority assignment information.

FIG. 9 illustrates an embodiment of content type/attribute based priority assignment information.

DETAILED DESCRIPTION

Described embodiments provide techniques to have a secondary server at a secondary site determine priority for cached objects based on measured or anticipated access to cached objects. This secondary site determined priority may be sent to the primary site to use to determine an ordering for transmitting modifications for cached objects based on network bandwidth measurements to favor the transfer of higher priority objects during periods of limited network bandwidth. Objects having secondary site lower determined priorities may experience delays in transmission during low periods of network bandwidth.

Figure 1:
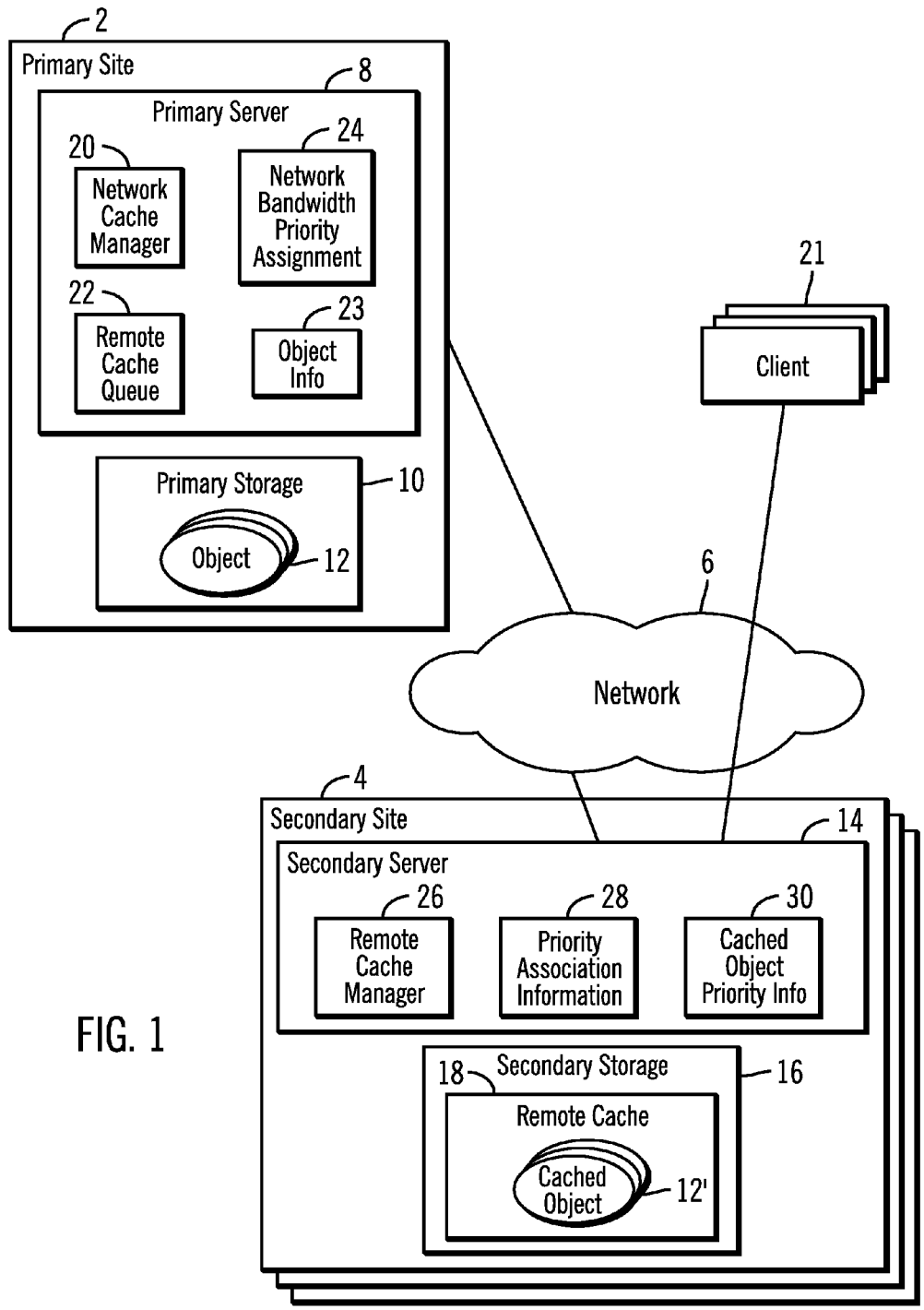
FIG. 1 illustrates a network computing environment in which embodiments are implemented.

FIG. 1 illustrates an embodiment of a network computing environment having a primary site 2 that communicates with one or more secondary sites 4 over a network 6. The primary site 2 includes a primary server 8 and a primary storage 10 having a plurality of objects 12. The secondary site 4 includes a secondary server 14 and a secondary storage 16 including a remote cache 18 to cache objects 12 at the primary storage 10 requested by clients 21 accessing the secondary server 14. The secondary server 12 may provide a global namespace of objects 12 at the primary site 2 available to clients 21 accessing the secondary server 12 as cached objects 12'. The clients 21 accessing a primary storage 10 object 12 made available through the secondary server 14 may cause the caching of the object 12 in the remote cache 18 as object 12'. In certain embodiments, the primary server 8 and secondary server 14 may comprise Network Attached Storage (NAS) servers that provides file based storage services to the clients 21 on the network 6. In alternative embodiments, the servers 8 and 14 may be implemented with other suitable network file server technology.

The primary server 8 includes a network cache manager 20 to manage caching operations at the secondary sites 4; a remote cache queue 22 having information on modifications for objects 12 to copy to the secondary servers 14 caching objects 12'; object information 23 on objects 12; and a network bandwidth priority assignment 24 providing an assignment of network bandwidth thresholds defining ranges of network bandwidths to different sets of priorities that may be associated with the objects 12.

The secondary server 14 includes a remote cache manager 26 to retrieve objects 12 from the primary site 2 requested by clients 21 connected to the secondary server 14 over the network 6. The remote cache manager 26 may provide a virtual global namespace to clients 21 for objects 12 maintained at the primary site 2. The secondary server 14 further includes priority association information 28 associating priorities with object attributes for the remote cache manager 26 to use to assign priorities to cached objects 12' in the remote cache 18 and cached object priority information 30 indicating the determined priorities of cached objects 12' in the remote cache 18.

The servers 8 and 14 may comprise a server class enterprise computing device capable of servicing requests from multiple connected clients 21. The clients 21 may comprise a desktop computer, server, host, portable computing device, such as a smart phone, tablet computing device, telephony device, laptop computer, portable device capable of being mounted in an automobile, etc.

The storages 10, 16 may be implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, Solid State Devices (SSD), storage-class memory (SCM)), electronic memory, magnetic tape media, tape cartridges, etc. The network 8 may comprise a local area network (LAN), storage area network (SAN), wide area network (WAN), a wireless network, the Internet, etc. The network 8 may include wireless network routers and may be part of a cloud computing model.

Figure 2:
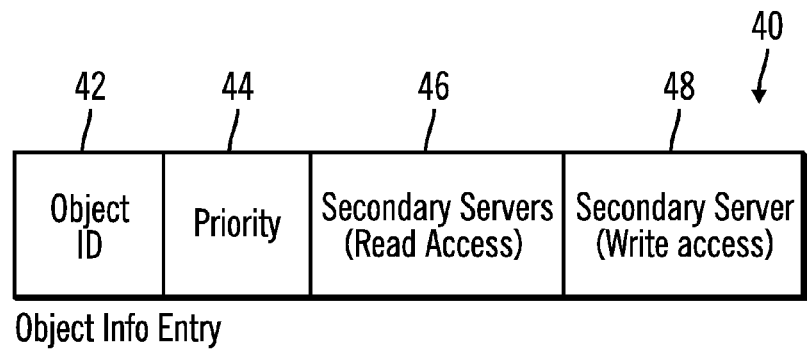
FIG. 2 illustrates an embodiment of an object information entry at the primary site.

FIG. 2 illustrates an embodiment of an object information entry 40 maintained in the primary server 8 object information 23, having an object identifier (ID) 42 of an object 12; a priority 44 of the object as determined at a secondary site 4 having access to the object 42 as a cached object 12'; one or more secondary servers 46 having non-exclusive read access to the modified object 42; and a secondary server 48 having exclusive write access to the object 42. In certain embodiments, only one secondary server 14 at one secondary site 4 may have exclusive write access to modify an object 12.

Figure 3:
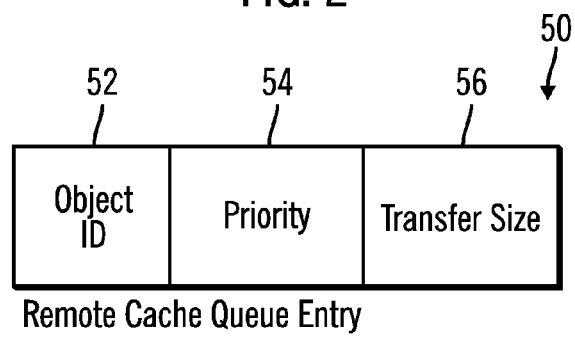
FIG. 3 illustrates an embodiment of a remote cache queue entry.

FIG. 3 illustrates an embodiment of a remote cache queue entry 50 maintained in the remote cache queue 22 having an object identifier (ID) 52 of a modified object 12; a priority 54 of the object as determined at a secondary site 4 having access to the object 52 as a cached object 12'; and a transfer size 56 of that portion or all of the object 52 to transfer. The transfer size 56 may comprise the size of the modified portion if only the modifications are transmitted to secondary sites 4 caching the object or may comprise the entire object size if the whole object including modifications is transferred.

Figure 4:
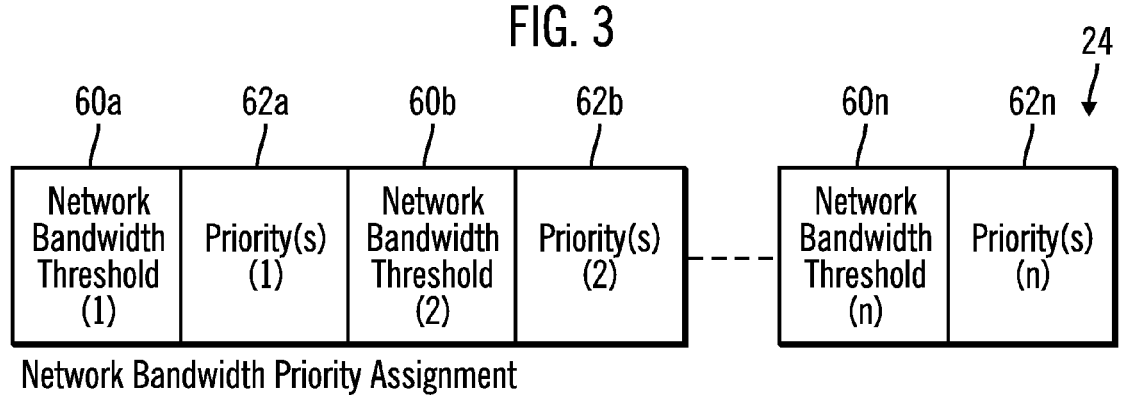
FIG. 4 illustrates an embodiment of a network bandwidth assignment priority.

FIG. 4 illustrates an embodiment of the network bandwidth priority assignment 24 as including a plurality of network bandwidth threshold/priority set pairs 60a/62a, 60b/62b . . . 60n/62n, where each priority set has one or more priority values of objects to transfer. The network bandwidth thresholds 60a, 60b . . . 60n, which may go from high to low network bandwidth thresholds, are used to determine which object priorities to transfer over the network 6 based on measured network bandwidth. For instance, if measured network bandwidth exceeds the high first network bandwidth threshold (1) 60a, then any objects having priorities in the first priority set (1) 62a may be transferred, which may comprise all priorities. If measured network bandwidth is below the lowest network bandwidth threshold (n) 60n, then there may be no objects transferred because the measured network bandwidth threshold falls below a lower bound. The lowest priority set (n) indicates a priority set to use when the measured network bandwidth is between the lowest network bandwidth threshold (n) and the next to lowest threshold (n−1). If the measured network bandwidth is between any two consecutive thresholds 60a, 60b . . . 60n, then the priority set of priorities for objects to transfer is the priority set 62a, 62b . . . 62n associated with the lower bandwidth threshold 60b . . . 60n of the two consecutive network bandwidth thresholds defining a range including the measured network bandwidth. For instance, if the measured network bandwidth is between the first network bandwidth threshold (1) and the second network bandwidth threshold (2), then objects having priorities indicated in the second priority set (2) are transferred. As the network bandwidth thresholds decrease, the number of priorities in the priority sets 62a, 62b . . . 62n may decrease to delay transfer of modifications for lower priority objects to limit transmissions to higher priority objects during lower network bandwidth periods.

Figure 5:
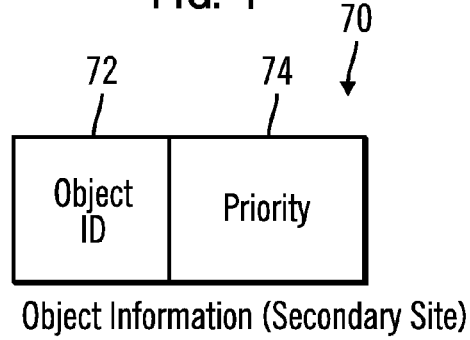
FIG. 5 illustrates an embodiment of object information maintained at the secondary site.

FIG. 5 illustrates an embodiment of an instance 70 of the cached object priority information 30 for cached objects at the secondary site 4 as including an object ID 72 and a priority 74 assigned to the object by the secondary server 14 based on user access to the cached object 12' at the secondary site 4.

FIG. 6 illustrates an embodiment 80 of priority association information 28 used by the secondary server 14 to determine a priority to assign to cached objects 12' based on user access frequency for cached objects 12'. Access frequency thresholds 82a, 82b . . . 82n, which may go from high user access frequency thresholds to lower, are used to determine which priority to assign to cached objects 12' based on user access frequency. For instance, if the measured user access frequency for a cached object 12' exceeds the high first access frequency threshold (1) 82a, then the assigned priority for that cached object 12' is the highest first priority (1) 84a. The lowest access frequency threshold 82n for the cached object 12' may comprise the lowest possible value, so the assigned priority for that cached object 12 is the lowest possible priority (n) 84n. If the measured user access frequency for the cached object 12' is between any two consecutive user access frequency thresholds 82a, 82b . . . 82n, then the assigned priority for the cached object 12' is the priority 84a, 84b . . . 84n associated with the lower frequency access threshold 82b . . . 82n of the two consecutive access frequency thresholds bounding the measured user access frequency for the cached object 12. For instance, if the measured user access frequency for the cached object 12' is between the first access frequency threshold (1) 82a and the second access frequency threshold (2) 82b, then the second priority (2) 84b is assigned to the cached object 12'. As the access frequency thresholds decrease, the assigned priority becomes smaller because less frequently accessed objects are deemed to have lower need and priority.

FIG. 7 illustrates an embodiment 90 of priority association information 28 used by the secondary server 14 to determine a priority to assign to cached objects 12' based on a customer support level of a customer that has accessed the cached object 12'. For each possible customer support level 92a, 92b . . . 92n there is a corresponding priority 94a, 94b . . . 94n, respectively, to assign to an object accessed by a customer operating under the indicated customer support level 92a, 92b . . . 92n. The customer support level may be considered for the customer that accessed the cached object 12' to cause it to be cached, the most recent accessing customers, or some calculated customer support level based on the support level of the last accessing customers. In this way, cached objects 12' being accessed at the secondary site 4 by customers having or paying for a higher support level are assigned a higher priority by the secondary server 14.

FIG. 8 illustrates an embodiment of an entry 100 in the priority association information 28 used by the secondary server 14 to determine a priority to assign to cached objects 12' based on an event occurring in an environment external to the secondary server 14, such as an event in the real world, a virtual world, political world, natural environment, financial world, etc., that would result in increased or decreased demand for a cached object 12'. The event based priority association includes a plurality of entries 100, one for each different possible event. Each event based entry 100 includes an event description 102 identifying the event, effected objects 104 whose access at the secondary site 4 is likely to be effected by the event 102 in a predictable manner, and a priority 106 to assign to the effected objects 104 due to the event. For instance, if an event is likely to lead to high demand for an object, such as a sudden financial market move that will likely lead to changed access patters of financial information related objects, then the priority for that object will be increased due to the event. Certain events may cause the priority for effected objects to be lowered if the event will predictably lead to less access of an object.

FIG. 9 illustrates an embodiment of an entry 90 in the priority association information 28 used by the secondary server 14 to determine a priority to assign to cached objects 12' based on determined content type or attributes of the cached objects 12. The content/attributes based priority association information includes a plurality of entries 110, one for each content type/attribute that is to be associated with a priority. Each entry 110 identifies a content type/attribute 112 and associated priority 114, so that cached objects 12' determined to have the content type/attribute 112 of an entry 110 are assigned the associated priority 114.

Figure 10:
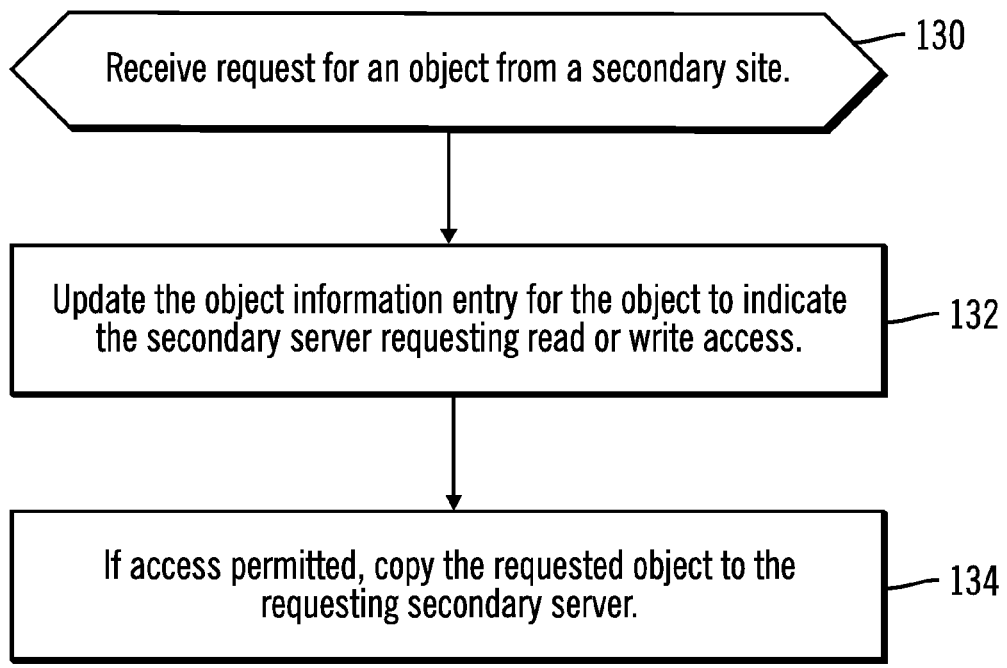
FIG. 10 illustrates an embodiment of operations to process a request for an object from a secondary site.

FIG. 10 illustrates an embodiment of operations performed by the network cache manager 20 upon receiving a request for an object from the secondary server 14 at the secondary site 4. Upon receiving (at block 130) a request for an object, the network cache manager 20 updates (at block 132) the object information entry 40 (FIG. 2) for the object to indicate the secondary server 14 requesting read or write access by indicating the secondary server 14 identifier in fields 46 or 48. If (at block 134) access is granted, then the network cache manager 20 transfers the requested object to the requesting secondary server 14.

Figure 11:
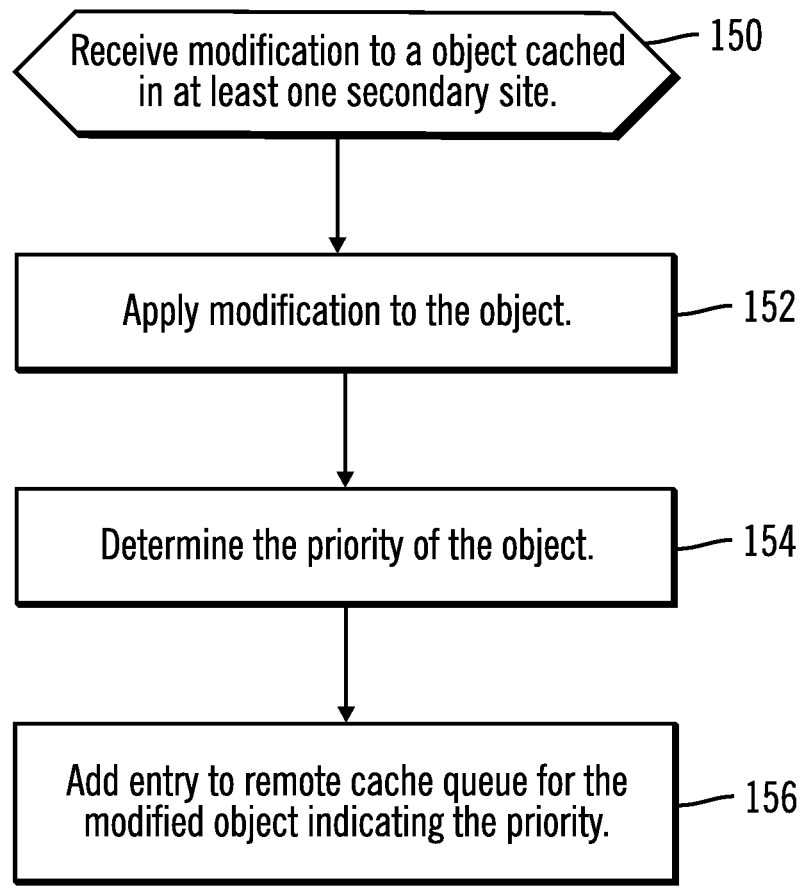
FIG. 11 illustrates an embodiment of operations to process a modification to an object cached at a secondary site.

FIG. 11 illustrates an embodiment of operations performed by the network cache manager 20 to process an update or modification to an object cached in at least one secondary site 4. Upon receiving (at block 150) the modification, the network cache manager 20 applies (at block 152) the modification to the object 12 and determines (at block 154) the priority for the modified object 12, such as from priority 44 in the object information entry 40 for the object. The network cache manager 20 adds (at block 156) an entry 50 (FIG. 3) to the remote cache queue 22 for the modified object indicating the priority 54. If there is a preexisting entry 50 in the remote cache queue 22 for the modified object 12, then that entry 50 may be updated or supplemented with the information on the new modification. The entry 50 indicates the priority 54 and a transfer size 56 of the modification or object to transfer.

Figure 12:
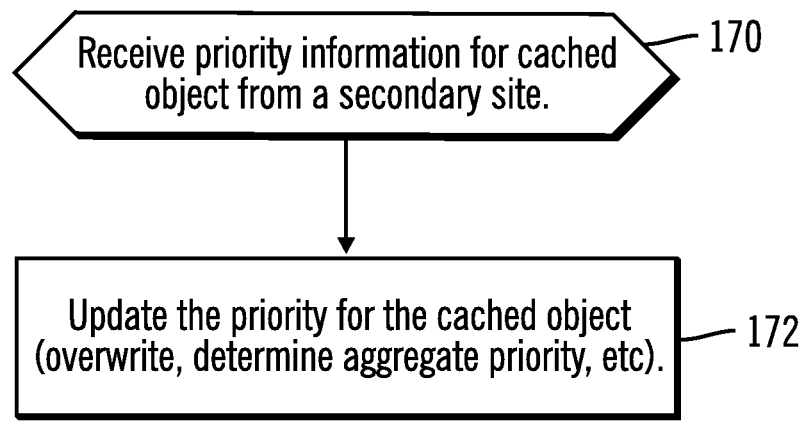
FIG. 12 illustrates an embodiment of operations to process received priority information for an object cached at a secondary site.

FIG. 12 illustrates an embodiment of operations performed by the network cache manager 20 to process priority information for a cached object 12' received from a secondary server 14. Upon receiving (at block 170) the priority information for a cached object assigned by the secondary server 14, the network cache manager 20 updates (at block 172) the priority 44 for the object 12 with the received priority. The update operation may overwrite the existing priority with the received priority, determine an aggregate priority based on previously received priorities for the object, etc.

The network cache manager 20 may receive priorities for a same object cached at multiple secondary sites. Because each secondary site is calculating priorities for cached objects based on access and potential access attributes of the cached objects particular to each secondary site, the network cache manager 20 may receive different priorities from different secondary sites 4 for the same object 12. In such case, the network cache manager 20 may have to select from or aggregate the different received priorities for one object 12.

Figure 13:
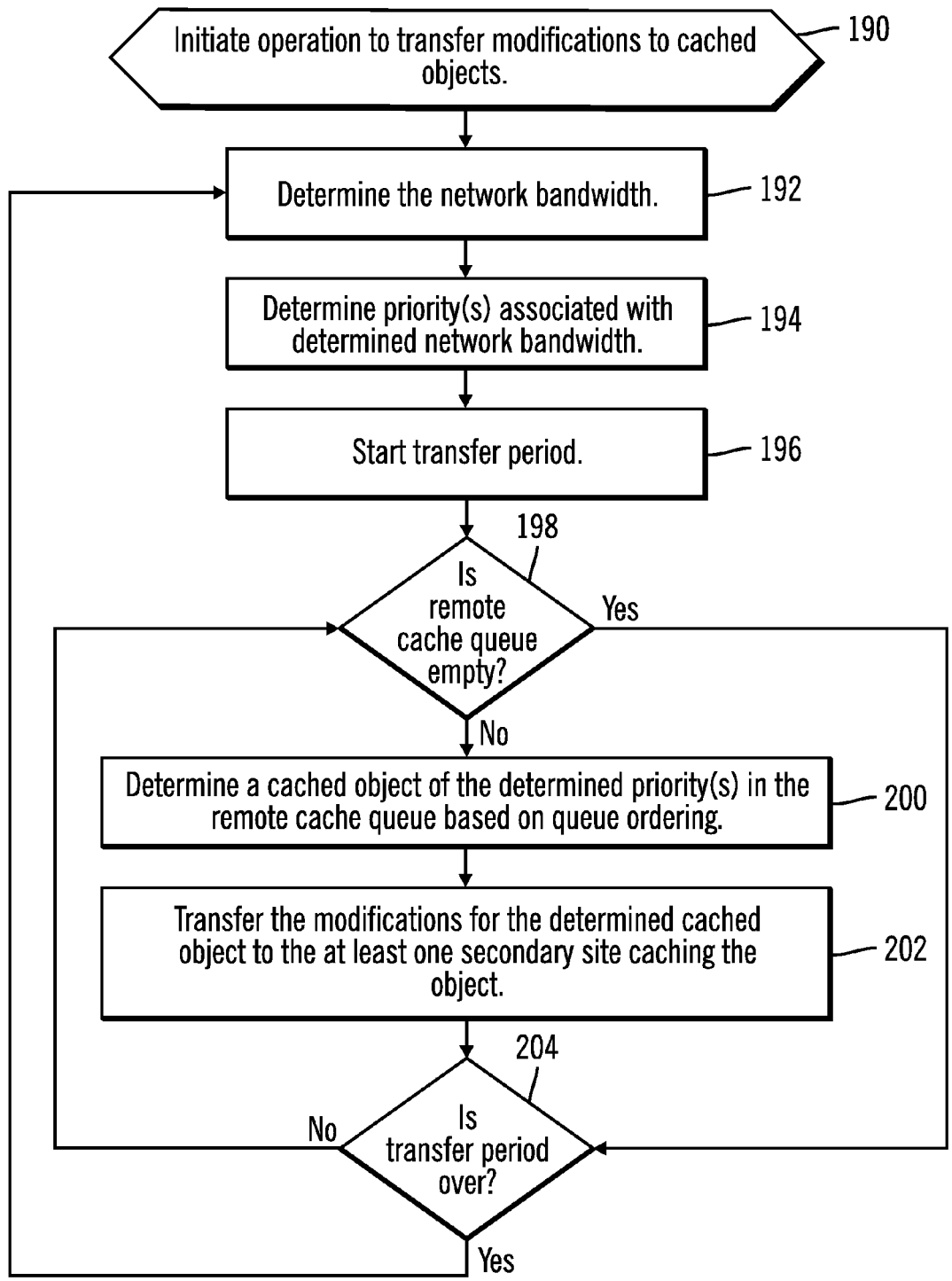
FIG. 13 illustrates an embodiment of operations to transfer modifications to cached objects to secondary sites.

FIG. 13 illustrates an embodiment of operations performed by the network cache manager 20 to transfer modifications to cached objects to the secondary server 14 caching the objects 12' using the remote cache queue 22. Upon initiating (at block 190) the operation to transfer modifications, the network cache manager 20 determines (at block 192) current network bandwidth conditions. The priority associated with that determined network bandwidth may be determined from the network bandwidth priority assignment 24 to determine the priority set of one or more priorities of objects to transfer. A transfer period is started (at block 196), which may be determined by a fixed number of transfers or a time clock. Upon starting the transfer period, if (at block 198) the remote cache queue 22 is not empty, then the network cache manager 20 determines (at block 202) a cached object of the determined priority(s) in the remote cache queue 22 based on the cache ordering. The remote cache queue 22 entries may be ordered by priority so that modifications for higher priority objects are transferred first before modifications for lower priority objects. Further, the queue 22 may select modifications within a priority based on a transfer size 56 to favor transferring smaller sized modifications/objects to maximize the number of cached objects receiving the modifications. The modifications for the determined cached object are transferred (at block 202) to the at least one secondary server 14 caching the object, as indicated in the secondary servers fields 46 and 48 of the object information entry 40 for the object.

After selecting the modifications to transfer (at block 202), if (at block 204) the transfer period is not over, control proceeds back to block 198 to select a next modification to process. If (at block 204) the transfer period has ended, e.g., number of transfers occurred, time expired, etc., then control proceeds back to block 192 to determine the current network 6 bandwidth. If (at block 198) the remote cache queue 22 is empty, then control proceeds to block 204 to consider whether the transfer period is over.

With the operations of FIG. 13, the measured network 6 bandwidth and priorities assigned to the objects by the secondary sites 4 accessing the objects are used to determine which objects the primary server 8 transfers, based on object priority and priorities assigned to different network bandwidth ranges.

Figure 14:
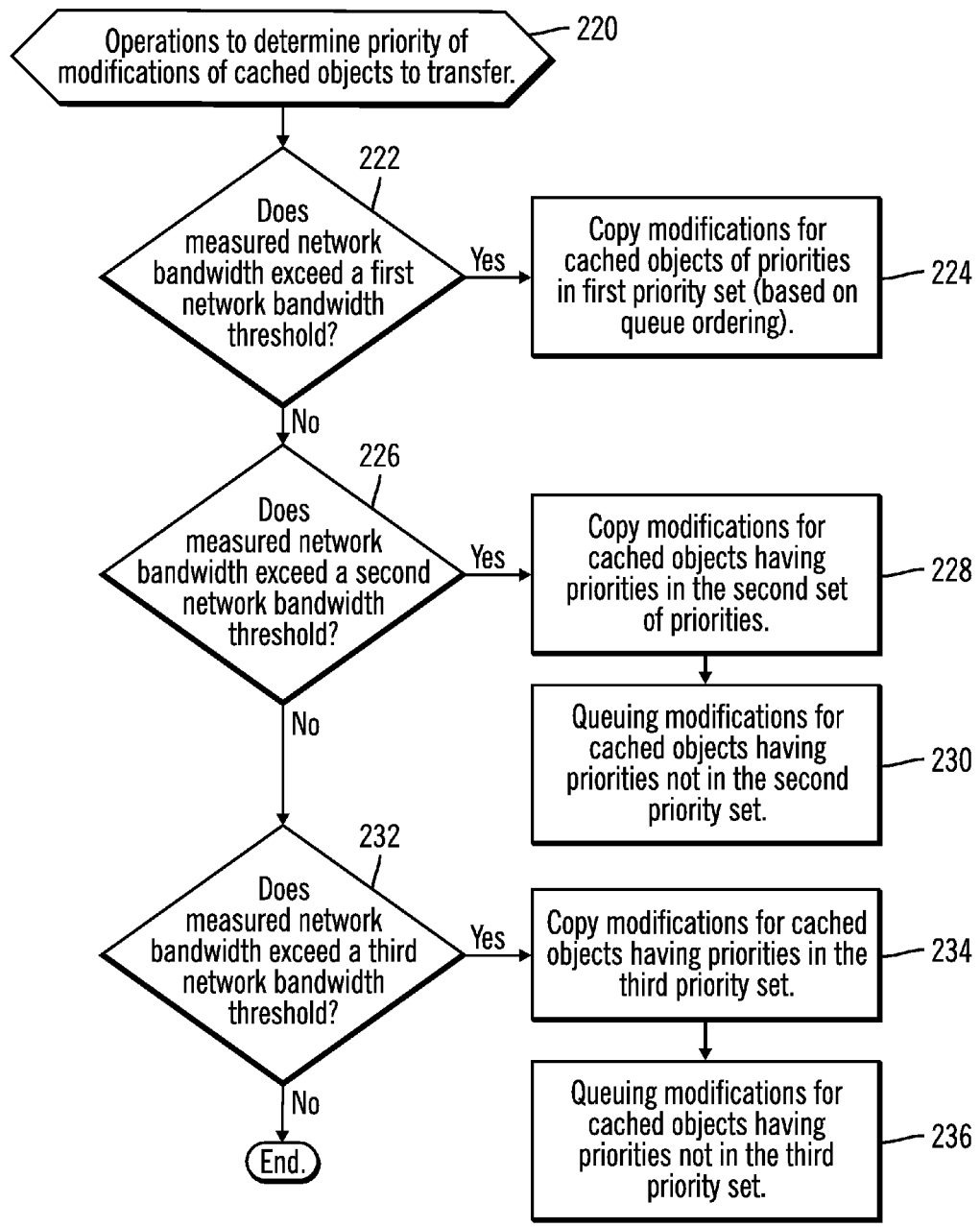
FIG. 14 illustrates an embodiment of operations to determine priority of modifications to cached objects to transfer.

FIG. 14 illustrates an embodiment of the operations performed by the network cache manager 20 at block 200 in FIG. 13 to determine modifications for objects identified in the remote cache queue 22 to transfer when there are three network bandwidth threshold 60a, 60b, 60n/priority set 62a, 62b, 62n pairs. Upon initiating (at block 220) the operations, if (at block 222) the measured network bandwidth exceeds a highest first network bandwidth threshold (1) 60a (FIG. 4), then the network cache manager 20 copies modifications for cached objects having priorities in the first priority set 62a, which may comprise all priorities because measured network bandwidth is high, exceeding the highest threshold 60a. Modifications from the remote cache queue 22 may be selected based on the queue 22 ordering, such as priority 54 then transfer size 56. If (at block 222) the measured network bandwidth is less than the first network bandwidth threshold (1) 60a and greater (at block 226) than the second network bandwidth threshold (2) 60b, then the network cache manager 20 copies (at block 228) modifications for cached objects having priorities in the second priority set 62b, which may comprise priorities except one or more lower priorities, and queues (at block 230) in the remote cache queue 22 modifications for cached objects having priorities not in the second set 62b. This delays the transfer of modifications for certain lower priority objects while network bandwidth is below the high threshold. If (at block 226) the measured network bandwidth is less than the second network bandwidth threshold (2) 60b and greater (at block 232) than a third network bandwidth threshold (3), then the network cache manager 20 copies (at block 234) modifications for cached objects having priorities in the third priority set 62n, according to the remote cache queue 22 ordering. Modifications for cached objects 12 having priorities not in the third priority set 62n remain queued (at block 236) in the remote cache queue 22. If (at block 232) the measured network bandwidth is below a lowest possible level, then control may end without transferring any objects. With the operations of FIG. 14, additional thresholds and priority sets may be considered to determine the priorities of objects to transfer for additional ranges defined by further network bandwidth thresholds.

Figure 15:
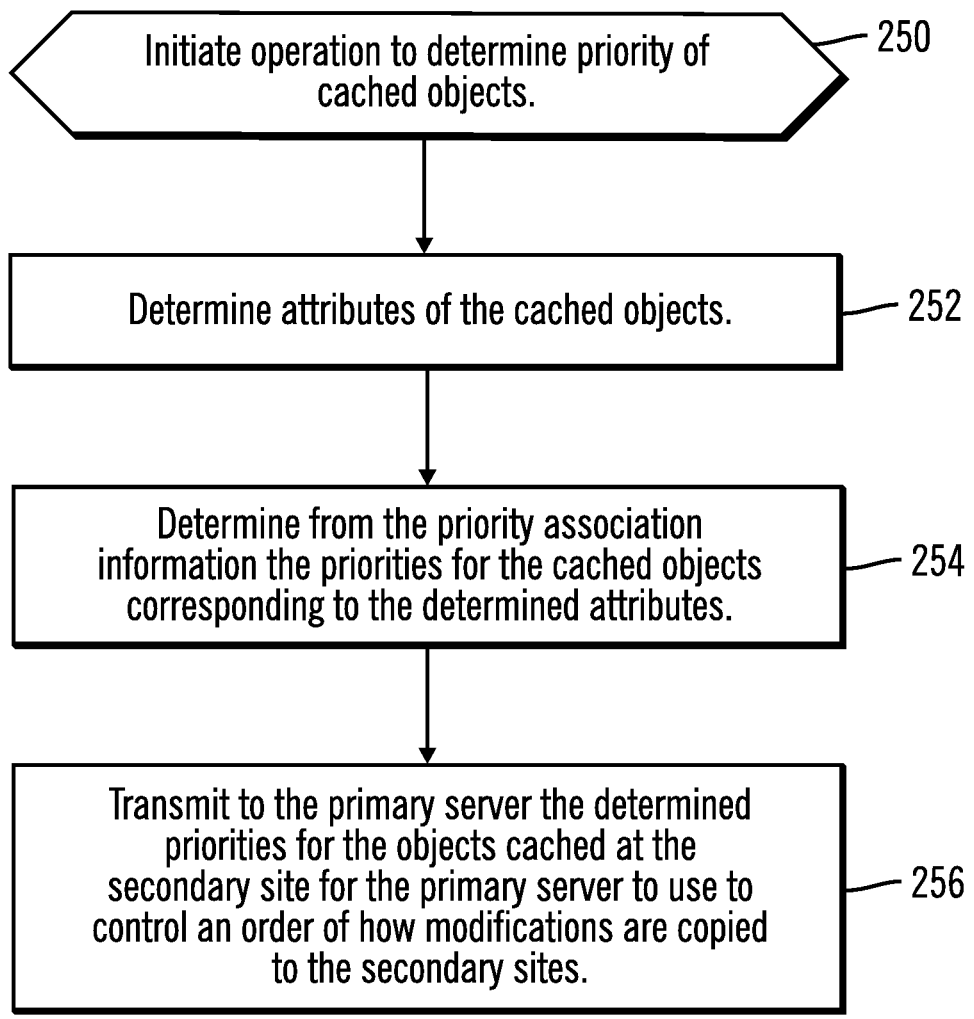
FIG. 15 illustrates an embodiment of operations to determine the priority of cached objects at the secondary site.

FIG. 15 illustrates an embodiment of operations performed by the remote cache manager 26 at the secondary server 14 to determine the priority of cached objects 12 based on attributes of the cached objects 12 at the secondary site 4. Upon initiating (at block 250) the operation to determine the priority of cached objects 12', the remote cache manager 26 determines (at block 252) attributes of the cached objects 12' and determines (at block 254) from the priority association information 28 the priorities for the cached objects corresponding to the determined attributes. The remote cache manager 26 transmits (at block 256) to the primary server 8 the determined priorities for the objects 12' cached at the secondary site 4 for the primary server 8 to use to control an order of how modifications are copied to the secondary sites.

In one embodiment, the secondary server 14 transmits the priority information for cached objects 12' directly to the primary server 24. In a further embodiment, the secondary server 14 may transmit the determined priority to another secondary site 4, so that this intermediary secondary site 4 writes the data and transmits the priority to the primary server 8.

Figure 16:
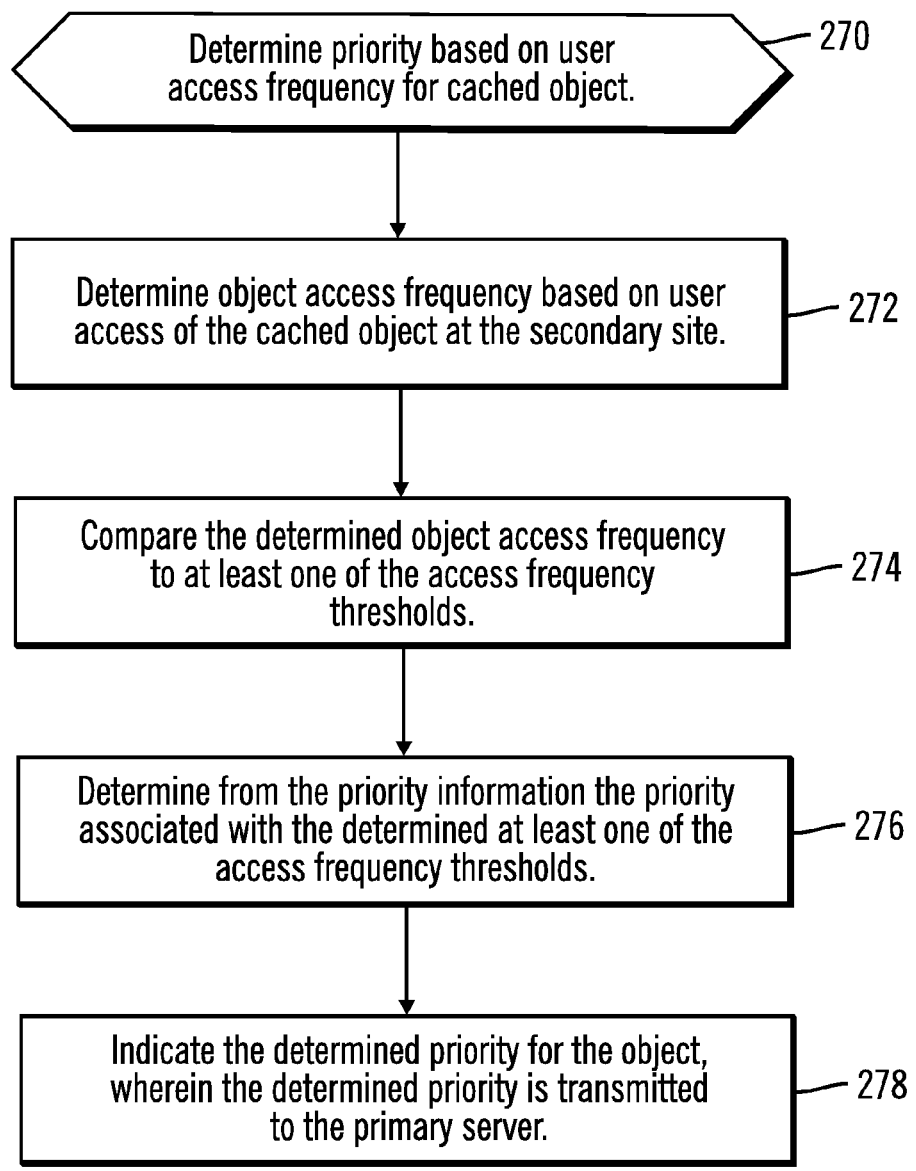
FIG. 16 illustrates an embodiment of operations to determine cached object priority based on user access frequency of the cached object.

FIG. 16 illustrates an embodiment of operations performed by the remote cache manager 26 to determine priority information based on user access frequency at the secondary site 4 for a cached object 12'. Upon initiating (at block 270) the operation to determine priority, the remote cache manager 26 determines (at block 272) an object access frequency based on user access of the cached object at the secondary site. The determined object access frequency is compared (at block 274) to at least one of the access frequency thresholds 62a, 62b ... 62n (FIG. 6). A determination is made (at block 276) of the priority associated with the determined at least one user access frequency threshold. For instance, if the user access frequency is greater than the highest threshold, then the highest priority is assigned, if the user access frequency is between two consecutive thresholds, then the priority for that threshold range is used. The determined priority for the cached object 12' is indicated (at block 278) in the cached object priority information 30 and transmitted to the primary server 8 to use to control transmissions of modifications to cached objects.

Figure 17:
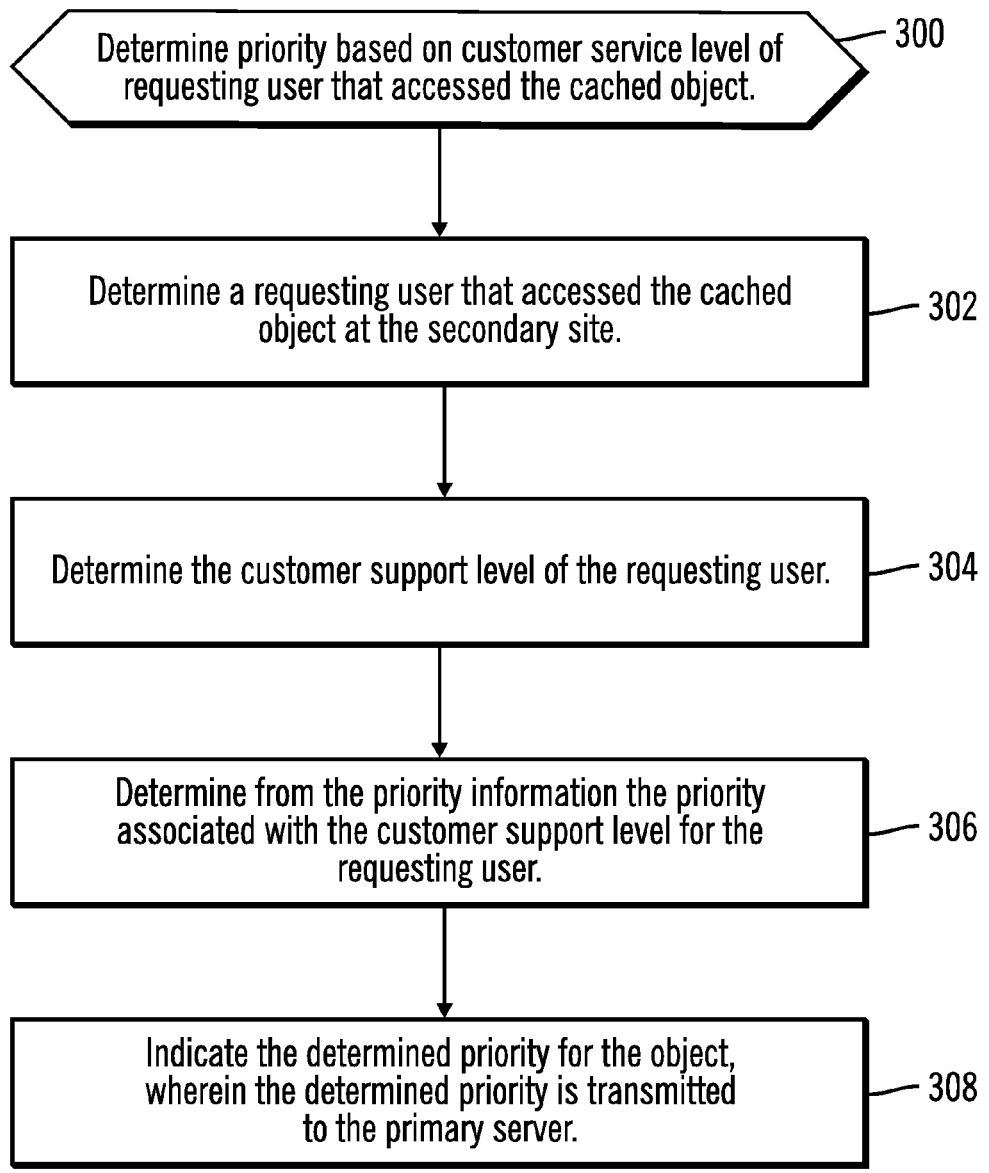
FIG. 17 illustrates an embodiment of operations to determine cached object priority based on customer service level of requesting user that accessed the cached object.

FIG. 17 illustrates an embodiment of operations performed by the remote cache manager 26 based on customer support level of users accessing the cached object 12' at the secondary site 4. Upon initiating (at block 300) the operation to determine priority based on customer support levels of the requesting user that accessed the cached object, the remote cache manager 26 determines (at block 302) a requesting user that accessed the cached object 12' at the secondary site 4. A determination is made (at block 304) of the customer support level of the requesting user. The remote cache manager 26 determines (at block 306) from the customer support level priority association information 90 the priority associated with the customer support level for the requesting user. The determined priority is indicated (at block 308) for the cached object 12' in the cached object priority information 30 and transmitted to the primary server 8. The customer support level may be considered for a most recent requesting user, the requesting user that first accessed the cached object 12' to cause the caching or a customer support level of a plurality of requesting users to provide an aggregate priority.

Figure 18:
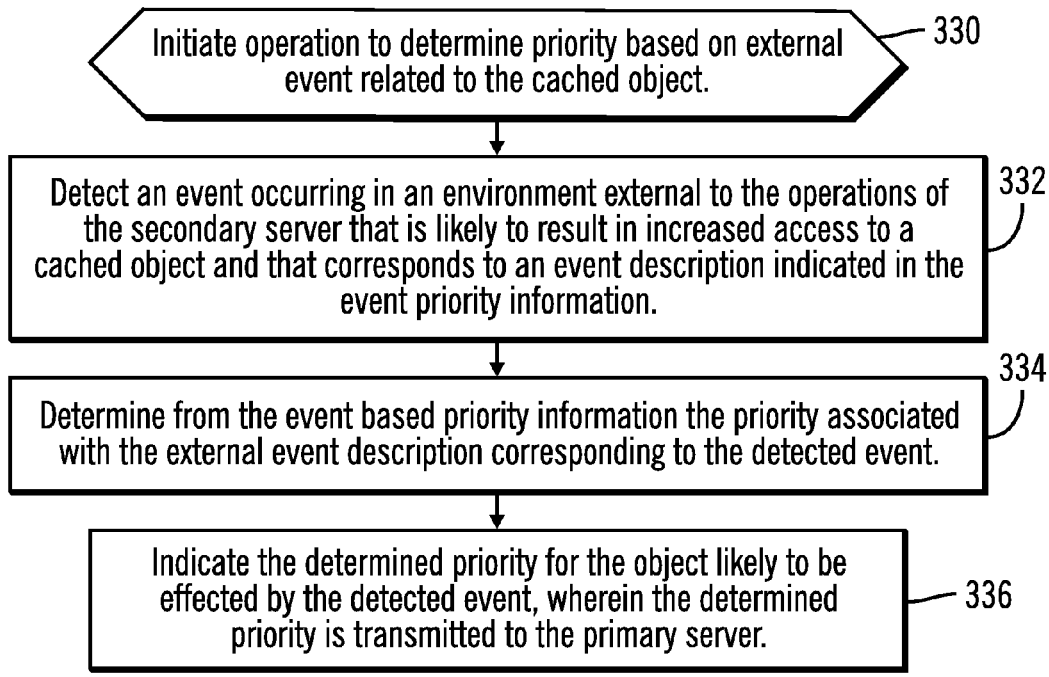
FIG. 18 illustrates an embodiment of operations to determine cached object priority based on an external event.

FIG. 18 illustrates an embodiment of operations performed by the remote cache manager 26 to determine priority of cached objects 12' based on occurrence of external events that are predicted to effect access to the cached objects 12'. Upon initiating (at block 330) an operation to determine event based priority, the remote cache manager 20 detects (at block 332) an event occurring in an environment external to the operations of the secondary server 14 that is likely to result in increased access to a cached object 12' and that corresponds to an event description 102 indicated in the event priority information 100 (FIG. 8). This event information may be transmitted to the secondary server 14 or pulled by the secondary server 14 from a remote location, such as a web site. The remote cache manager 26 determines (at block 334) from the event based priority information 100 the priority 106 associated with the external event description 102 indicated in one entry 100 corresponding to the detected event. The determined priority is indicated (at block 336) for the cached object 12' in the cached object priority information 30 and transmitted to the primary server 8. In this way the occurrence of an external event that is predicted to effect access to an object, increase or decrease, is used to alter the priority for the object.

Figure 19:
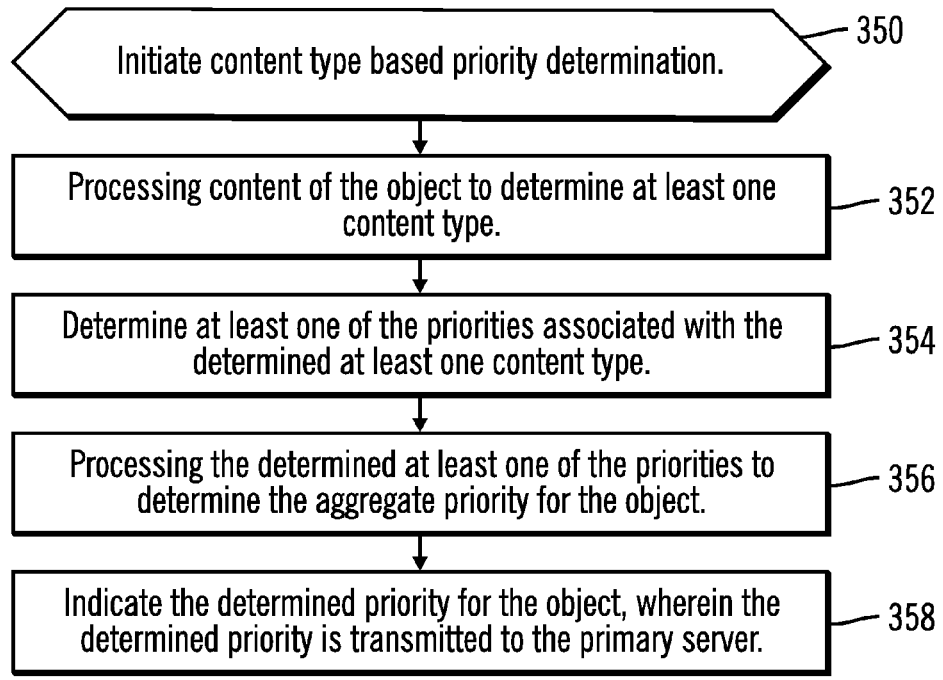
FIG. 19 illustrates an embodiment of operations to determine cached object priority based on a content type of the cached object.

FIG. 19 illustrates an embodiment of operations performed by the remote cache manager 26 to determine priority of cached objects 12' based on the content type of the cached objects 12'. Upon initiating (at block 350) content type based priority determination, the remote cache manager 20 processes (at block 352) content of the cached object 12' to determine at least one content type associated with the cached object content. A determination is made (at block 354) of at least one of the priorities associated with the determined at least one content type, such as the priority 114 associated with the determined content type 112 indicated in an entry 110 of the content type priority association information. The determined priority is indicated (at block 358) for the cached object 12' in the cached object priority information 30 and transmitted to the primary server 8.

In certain embodiments, one or more of the different priority determinations may be used to determine by determining a combined or aggregate priority by executing one or more of the user access frequency priority determination (FIG. 16), customer service level priority determination (FIG. 17), event based priority determination (FIG. 18), and content type priority determination (FIG. 19). Different determined priorities may then be aggregated or combined.

Described embodiments provide techniques to have a secondary server at a secondary site determine priority for cached objects based on measured or anticipated access to cached objects based on factors such as user access at the secondary site, customer support levels of customers accessing at the secondary site, content type, events, etc. This secondary site determined priority may be sent to the primary site to use to determine an ordering for transmitting modifications for cached objects based on network bandwidth measurements to favor the transfer of higher priority objects during periods of limited network bandwidth.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing environment may provide cloud based remote caching of objects from a primary site to a plurality of secondary sites.

The cloud computing implementation is further described with respect to FIGS. 1-19. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 20:
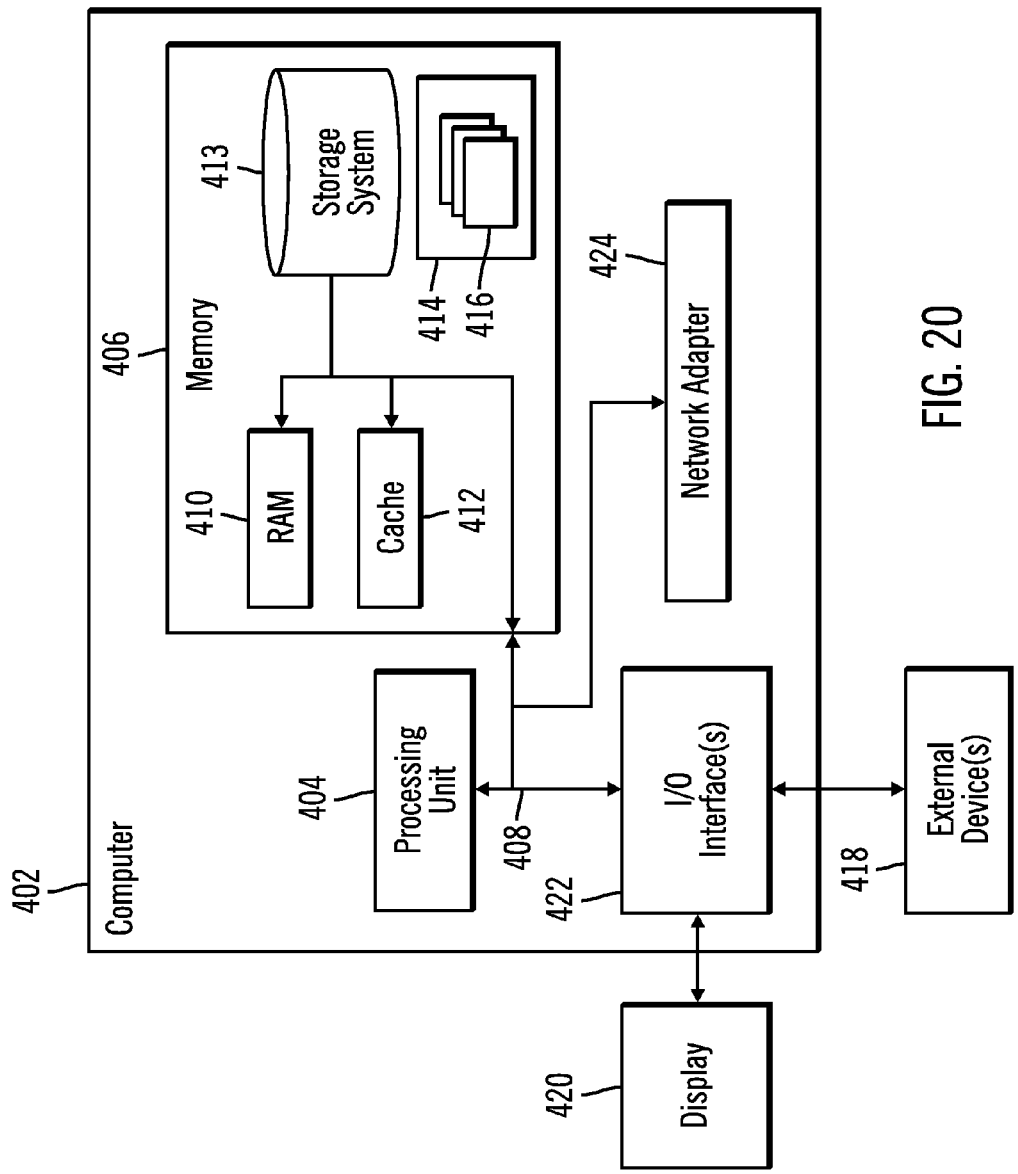
FIG. 20 illustrates an implementation of a computer/server node in the network computing embodiment.

FIG. 20 illustrates an embodiment of a cloud computing node or computer 402 which may comprise an implementation of the servers 8 and 14 and the clients 21. Computer 402 is only one example of a suitable cloud computing node and is not intended to suggest any limitation as to the scope of use or functionality of embodiments of the invention described herein. Regardless, cloud computing node 402 is capable of being implemented and/or performing any of the functionality set forth hereinabove.

The cloud computing computer 402 is operational with numerous other general purpose or special purpose computing system environments or configurations. Examples of well-known computing systems, environments, and/or configurations that may be suitable for use with computer system/server 402 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 20, computer system/server (cloud node) 402 is shown in the form of a general-purpose computing device. The components of computer system/server 402 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 12; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Figure 21:
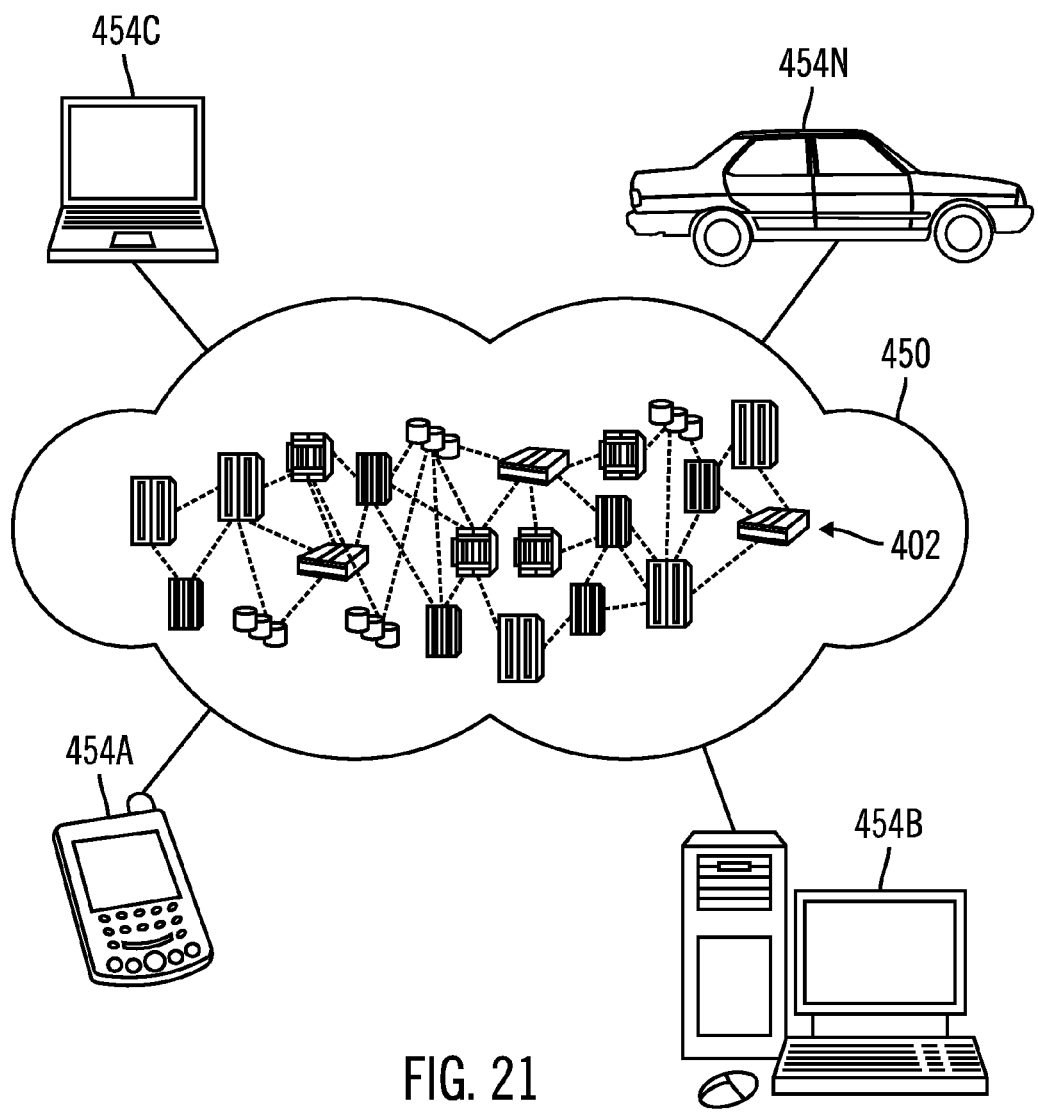
FIG. 21 illustrates an embodiment of a cloud computing environment.

FIG. 21 illustrates an embodiment of a cloud computing environment 450. As shown, cloud computing environment 450 comprises one or more cloud computing nodes 402 with which local computing devices used by cloud consumers, such as, for example, personal digital assistant (PDA) or cellular telephone 454A, desktop computer 454B, laptop computer 454C, and/or automobile computer system 454N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 21 are intended to be illustrative only and that computing nodes 402 and cloud computing environment 450 can communicate with any type of computerized device over any type of network and/or network addressable connection (e.g., using a web browser).

Figure 22:
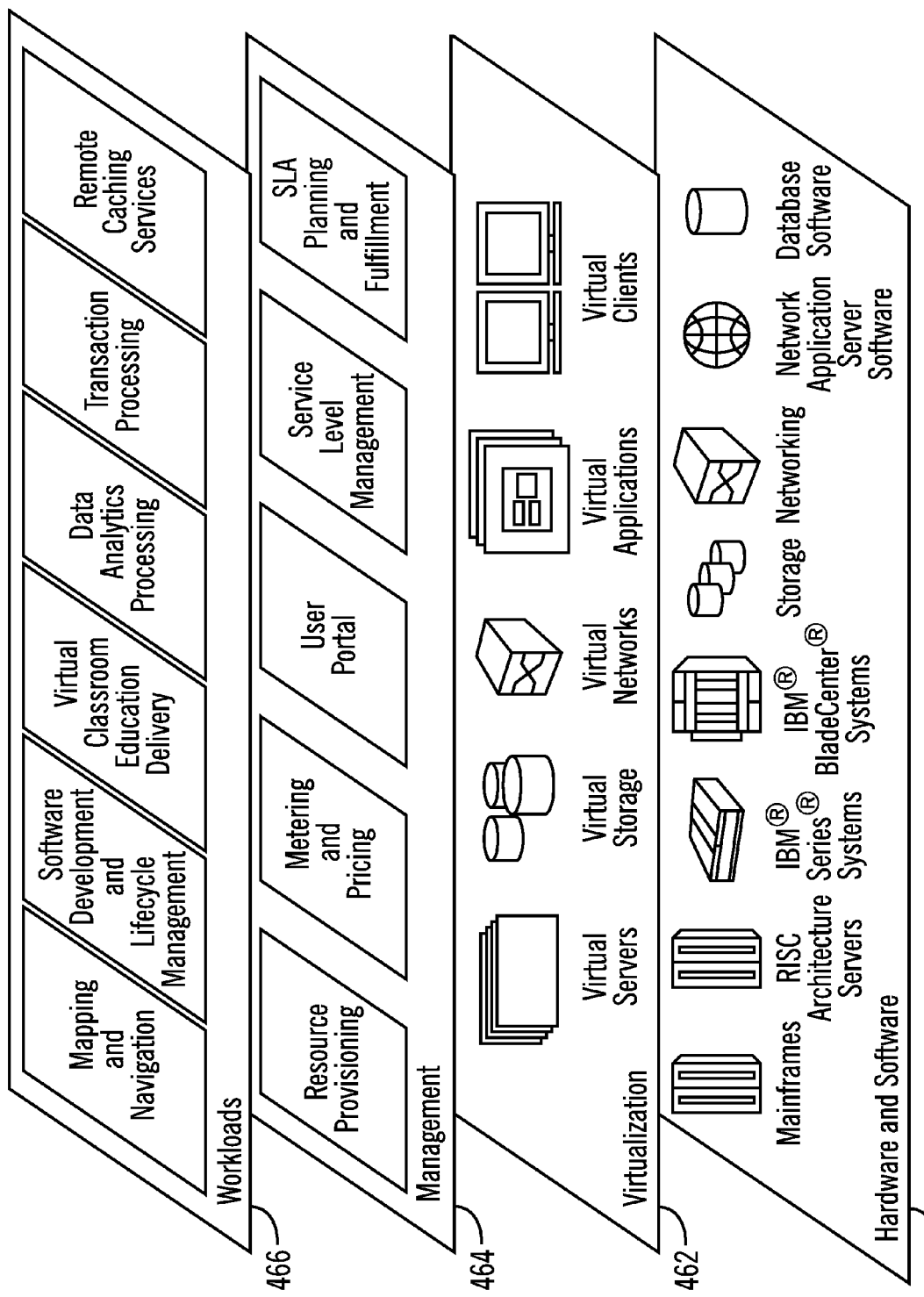
FIG. 22 illustrates an embodiment of abstraction model layers of a cloud computing environment.

FIG. 22 provides an embodiment a set of functional abstraction layers provided by cloud computing environment 450. It should be understood in advance that the components, layers, and functions shown in FIG. 22 re intended to be illustrative only and embodiments of the invention are not limited thereto. As depicted, the following layers and corresponding functions are provided:

Hardware and software layer 460 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 462 provides an abstraction layer from which the following examples of virtual entities may be provided: virtual servers; virtual storage; virtual networks, including virtual private networks; virtual applications and operating systems; and virtual sources.

In one example, management layer 464 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 466 provides examples of functionality for which the cloud computing environment may be utilized. Examples of workloads and functions may provide multi-tenancy for a cloud computing environment such as described with respect to FIGS. 1-19, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for caching objects, the computer program product comprising a non-transitory computer readable storage medium having computer readable program code embodied therein that executes to perform operations, the operations comprising:
    copying objects from a primary site to a secondary site to cache at the secondary site, wherein the primary site includes a primary server and primary storage and wherein the secondary site includes a secondary server and a secondary storage, wherein the primary and secondary sites connect via a network;
    receiving, from the secondary server, priorities for the objects at the secondary site based on determinations made by the secondary server with respect to information related to the objects cached at the secondary storage by the secondary server;
    determining modifications to the objects at the primary storage that are cached at the secondary storage; and
    using the received priorities for the objects from the secondary server to control a transfer of the determined modifications to the objects to the secondary server.

2. The computer program product of claim 1, wherein the priorities are assigned by the secondary server based on at least one of:
    administrator assigned priority;
    content of the object;
    detection of an external event that occurs in an environment external to the operations of the secondary server and wherein the external event is predetermined to likely result in increased access to the object at the secondary site; and
    customer support level of requesting user that requested the object through the secondary server to cause the object to be copied from the primary server to the secondary server.

3. The computer program product of claim 1, wherein the priorities for the objects include at least a first and second priorities, wherein the operations further comprise:
    determining a network bandwidth;
    determining at least one priority of cached objects to transfer associated with the determined network bandwidth;
    transferring the modifications for the cached objects having the determined at least one priority to the secondary server; and
    delaying the transfer of modifications for the cached objects not having the determined at least one priority to the secondary server.

4. The computer program product of claim 3, wherein the operations further comprise:

sorting modifications to objects within priorities according to transfer size, wherein transferring the modifications for cached objects of one priority first transfers modifications of smaller transfer size.

5. The computer program product of claim 1, wherein the priorities for the objects include at least a first, second, and third priorities, wherein the operations further comprise:
determining whether network bandwidth for the network falls below a first predetermined threshold;
in response to determining that the network bandwidth exceeds the first predetermined threshold, copying to the secondary server modifications for objects cached at the secondary site having the first, second and third priorities;
in response to determining that the network bandwidth falls below the first predetermined threshold and exceeds a second predetermined threshold, performing:
copying to the secondary server only modifications for objects having a priority in a first set of priorities; and
queuing modifications for objects cached at the secondary site not having one of the priorities in the first set of priorities; and
in response to determining that the network bandwidth falls below the second predetermined threshold, performing:
copying to the secondary site only modifications for objects having a priority in a second set of priorities that are cached at the secondary site, wherein the second set of priorities includes at least one less priority than the first set; and
queuing modifications for objects cached at the secondary site not one of the priorities in the second set.

6. The computer program product of claim 1, wherein the operations further comprise:
transmitting, by the primary server, objects at the primary site to a plurality of secondary sites over a network to cache at the secondary sites, wherein each secondary site has a secondary server and secondary storage;
providing, by the primary server, access to the objects maintained at the primary site to users accessing the objects through the secondary sites; and
receiving different priorities for at least one of the objects from the secondary sites accessing the objects.

7. A computer program product for caching objects, the computer program product comprising a computer readable storage medium having computer readable program code embodied therein that executes to perform operations, the operations comprising:
receiving at a secondary site objects transmitted from a primary site to cache at the secondary site, wherein the primary site includes a primary server and primary storage and wherein the secondary site includes a secondary server and a secondary storage to cache the objects from the primary site, wherein the primary and secondary sites are connected via a network;
maintaining, at the secondary server, priority association information providing an association of priorities and object attributes;
determining attributes concerning information related to the objects cached at the secondary site;
determining from the priority association information the priorities for the cached objects based on the determined attributes; and
transmitting to the primary server the determined priorities for the objects cached at the secondary storage for the primary server to use to control a transfer of the determined modifications to the objects to the secondary server.

8. The computer program product of claim 7,
wherein the priority information associates priorities to user access frequency thresholds,
wherein the determining the attributes for the objects comprises determining object access frequencies based on user access of the object while cached at the secondary site, and
wherein the determining the priority for the cached object comprises comparing the determined object access frequency to at least one of the access frequency thresholds and determining from the priority information the priority associated with the determined at least one of the access frequency thresholds.

9. The computer program product of claim 7,
wherein the priority information associates priorities with different customer support levels,
wherein the determining the attributes for the objects comprises determining a customer support level of a requesting user that accessed the cached object at the secondary site, and
wherein the determining the priority for the cached object comprises determining from the priority information the priority associated with the customer support level for the requesting user.

10. The computer program product of claim 7,
wherein the priority information associates external event descriptions to cached objects and priorities, wherein the external event occurs in an environment external to the operations of the secondary server and wherein the external event is predetermined to likely result in changed access to the object at the secondary site,
wherein the determining the attributes for the objects comprises detecting an event corresponding to one of the external event descriptions indicated in the priority information, and
wherein the determining the priority for the cached object comprises determining from the priority information the cached object and the priority associated with the external event description corresponding to the detected event.

11. The computer program product of claim 7,
wherein the priority information associates priorities to content types,
wherein the determining the attributes for the cached objects comprises processing content of the object to determine at least one content type for the cached objects, and
wherein the determining the priority comprises determining at least one of the priorities associated with the determined at least one content type and processing the determined at least one of the priorities to determine the priority for the cached objects.

12. The computer program product of claim 7, wherein the priorities are assigned by the secondary server based on at least one of:
administrator assigned priority;
content of the object;
administrator settings applied to the object;
detection of an external event that occurs in an environment external to the operations of the secondary server and wherein the external event is predetermined to likely result in increased access to the object at the secondary site; and customer support level of requesting user that requested the object through the secondary server to cause the object to be copied from the primary site to the secondary site user.

13. A system for caching objects in communication with a secondary site over a network, wherein the secondary site has a secondary server and secondary storage, comprising:
  a storage;
  a processor;
  a computer readable storage medium having code executed by the processor to perform operations, the operations comprising:
    copying objects from the storage to the secondary site to cache at the secondary site;
    receiving, from the secondary server, priorities for the objects at the secondary site based on determinations made by the secondary server with respect to information related to the objects cached at the secondary storage by the secondary server;
    determining modifications to the objects at the primary storage that are cached at the secondary storage; and
    using the received priorities for the objects from the secondary server to control a transfer of the determined modifications to the objects to the secondary server.

14. The system of claim 13, wherein the priorities for the objects include at least a first and second priorities, wherein the operations further comprise:
  determining a network bandwidth;
  determining at least one priority of cached objects to transfer associated with the determined network bandwidth;
  transferring the modifications for the cached objects having the determined at least one priority to the secondary server; and
  delaying the transfer of modifications for the cached objects not having the determined at least one priority to the secondary server.

15. The system of claim 14, wherein the operations further comprise:
  sorting modifications to objects within priorities according to transfer size, wherein transferring the modifications for cached objects of one priority first transfers modifications of smaller transfer size.

16. The system of claim 13, wherein the priorities for the objects include at least a first, second, and third priorities, wherein the operations further comprise:
  determining whether network bandwidth for the network falls below a first predetermined threshold;
  in response to determining that the network bandwidth exceeds the first predetermined threshold, copying to the secondary server modifications for objects cached at the secondary site having the first, second and third priorities;
  in response to determining that the network bandwidth falls below the first predetermined threshold and exceeds a second predetermined threshold, performing:
    copying to the secondary server only modifications for objects having a priority in a first set of priorities; and
    queuing modifications for objects cached at the secondary site not having one of the priorities in the first set of priorities; and
  in response to determining that the network bandwidth falls below the second predetermined threshold, performing:
    copying to the secondary site only modifications for objects having a priority in a second set of priorities that are cached at the secondary site, wherein the second set of priorities includes at least one less priority than the first set; and
    queuing modifications for objects cached at the secondary site not one of the priorities in the second set.

17. The system of claim 13, wherein the priorities are assigned by the secondary server based on at least one of:
  administrator assigned priority;
  content of the object;
  detection of an external event that occurs in an environment external to the operations of the secondary server and wherein the external event is predetermined to likely result in increased access to the object at the secondary site; and
  customer support level of requesting user that requested the object through the secondary server to cause the object to be copied from the primary server to the secondary server.

18. The system of claim 13, wherein the operations further comprise:
  transmitting, by the primary server, objects at the primary site to a plurality of secondary sites over a network to cache at the secondary sites, wherein each secondary site has a secondary server and secondary storage;
  providing, by the primary server, access to the objects maintained at the primary site to users accessing the objects through the secondary sites; and
  receiving different priorities for at least one of the objects from the secondary sites accessing the objects.

19. A system for caching objects in communication with a primary site over a network, wherein the primary site has a primary server and a primary storage, comprising:
  a storage;
  a processor;
  a computer readable storage medium having code executed by the processor to perform operations, the operations comprising:
    receiving objects transmitted from the primary site to cache at the storage;
    maintaining priority association information providing an association of priorities and object attributes;
    determining attributes concerning information related to the objects cached in the storage;
    determining from the priority association information the priorities for the cached objects based on the determined attributes; and
    transmitting to the primary server the determined priorities for the objects cached at the storage for the primary server to use to control a transfer of the determined modifications to the objects to the system.

20. The system of claim 19,
  wherein the priority information associates priorities to user access frequency thresholds,
  wherein the determining the attributes for the objects comprises determining object access frequencies based on user access of the object while cached at the storage and
  wherein the determining the priority for the cached object comprises comparing the determined object access frequency to at least one of the access frequency thresholds and determining from the priority information the priority associated with the determined at least one of the access frequency thresholds.

21. The system of claim 19,
wherein the priority information associates priorities with different customer support levels,
wherein the determining the attributes for the objects comprises determining a customer support level of a requesting user that accessed the cached object at the storage and
wherein the determining the priority for the cached object comprises determining from the priority information the priority associated with the customer support level for the requesting user.

22. The system of claim 19,
wherein the priority information associates external event descriptions to cached objects and priorities, wherein the external event occurs in an environment external to the operations of the system and wherein the external event is predetermined to likely result in changed access to the object cached at the storage
wherein the determining the attributes for the objects comprises detecting an event corresponding to one of the external event descriptions indicated in the priority information, and
wherein the determining the priority for the cached object comprises determining from the priority information the cached object and the priority associated with the external event description corresponding to the detected event.

23. The system of claim 19,
wherein the priority information associates priorities to content types,
wherein the determining the attributes for the cached objects comprises processing content of the object to determine at least one content type for the cached objects, and
wherein the determining the priority comprises determining at least one of the priorities associated with the determined at least one content type and processing the determined at least one of the priorities to determine the priority for the cached objects.

24. The system of claim 19, wherein the priorities are assigned by the system based on at least one of:
administrator assigned priority;
content of the object;
administrator settings applied to the object;
detection of an external event that occurs in an environment external to the operations of the system and wherein the external event is predetermined to likely result in increased access to the object; and
customer support level of requesting user that requested the object through the system to cause the object to be copied from the primary site.

* * * * *